(12) United States Patent
Shao

(10) Patent No.: US 12,689,785 B2
(45) Date of Patent: Jul. 21, 2026

(54) METHOD AND APPARATUS FOR SENDING VIDEO DATA, AND ELECTRONIC DEVICE

(71) Applicant: VIVO MOBILE COMMUNICATION CO., LTD., Guangdong (CN)

(72) Inventor: Shengjun Shao, Guangdong (CN)

(73) Assignee: Vivo Mobile Communication Co., Ltd., Dongguan City (CN)

( * ) Notice: Subject to any disclaimer, the term of this patent is extended or adjusted under 35 U.S.C. 154(b) by 0 days.

(21) Appl. No.: 19/015,229

(22) Filed: Jan. 9, 2025

(65) Prior Publication Data

US 2025/0150653 A1 May 8, 2025

Related U.S. Application Data

(63) Continuation of application No. PCT/CN2023/110478, filed on Aug. 1, 2023.

(30) Foreign Application Priority Data

Aug. 3, 2022 (CN) ......................... 202210930148.X

(51) Int. Cl.
*H04N 21/266* (2011.01)
*H04N 21/231* (2011.01)
(Continued)

(52) U.S. Cl.
CPC . *H04N 21/26616* (2013.01); *H04N 21/23106* (2013.01); *H04N 21/2343* (2013.01); *H04N 21/2393* (2013.01); *H04N 21/8455* (2013.01)

(58) Field of Classification Search
CPC ......... H04N 21/2343; H04N 21/23106; H04N 21/2393; H04N 21/8455; H04N 21/234309; H04N 21/26616
See application file for complete search history.

(56) References Cited

U.S. PATENT DOCUMENTS 7,523,482 B2 * 4/2009 Barrett ............... H04N 21/4383
725/120
8,014,393 B1 * 9/2011 Faheem .............. H04L 47/2416
370/468
(Continued)

FOREIGN PATENT DOCUMENTS

CN 109325199 A 2/2019
CN 113630575 A 11/2021
(Continued)

OTHER PUBLICATIONS

Chinese First Office Action with English Translation, Serial No. 202210930148.X, Applicant: Vavor Mobile Communications Co., Ltd., Title of Invention: Video Data Transmission Method.
(Continued)

*Primary Examiner* — John R Schnurr
(74) *Attorney, Agent, or Firm* — Reising Ethington, P.C.

(57) ABSTRACT

This application provides a method and an apparatus for sending video data, and an electronic device. The method includes: encoding a video stream by using a first encoder in a server, to generate first encoded data, and sending the first encoded data to at least one first user equipment; in a case that the server receives a first video display request corresponding to the first encoded data and sent by a second user equipment, encoding the video stream by using a second encoder, to generate second encoded data, and sending the second encoded data to the second user equipment; and in a case that the first encoded data satisfies a preset condition, sending the first encoded data to the second user equipment, continuing to send the first encoded data to the at least one first user equipment, and stopping sending the second encoded data to the second user equipment.

14 Claims, 5 Drawing Sheets

(51) Int. Cl.
H04N 21/2343 (2011.01)
H04N 21/239 (2011.01)
H04N 21/845 (2011.01)

(56) References Cited

U.S. PATENT DOCUMENTS

| 8,514,891 | B2 * | 8/2013 | Green | H04N 21/26616 |
| | | | | 725/86 |
| 2004/0034864 | A1 * | 2/2004 | Barrett | H04N 21/658 |
| | | | | 725/38 |
| 2005/0081244 | A1 * | 4/2005 | Barrett | H04N 21/472 |
| | | | | 725/38 |
| 2005/0190781 | A1 | 9/2005 | Green et al. | |
| 2007/0160038 | A1 * | 7/2007 | Liu | H04N 21/44209 |
| | | | | 370/437 |
| 2007/0250890 | A1 * | 10/2007 | Joshi | H04N 21/26275 |
| | | | | 348/E7.071 |
| 2008/0175273 | A1 * | 7/2008 | Johansson | H04N 21/4331 |
| | | | | 370/473 |
| 2010/0111108 | A1 * | 5/2010 | Akgul | H04N 21/4384 |
| | | | | 370/474 |
| 2011/0302604 | A1 * | 12/2011 | Halen | H04N 21/26616 |
| | | | | 725/38 |
| 2012/0117265 | A1 * | 5/2012 | Xu | H04N 21/44016 |
| | | | | 709/231 |
| 2013/0332974 | A1 * | 12/2013 | Lundqvist | H04N 21/6405 |
| | | | | 725/109 |
| 2018/0295411 | A1 * | 10/2018 | Xu | H04N 21/6408 |

FOREIGN PATENT DOCUMENTS

| CN | 113810718 A | 12/2021 | |
| CN | 115297343 A | 11/2022 | |
| EP | 3890329 A1 * | 10/2021 | H04N 21/6408 |
| JP | H11284953 A | 10/1999 | |
| JP | 2009284282 A | 12/2009 | |
| JP | 2014017554 A | 1/2014 | |

OTHER PUBLICATIONS

PCT Search Report and Written Opinion, Int. Application No. PCT/CN2023/110478, Int. Filing Date: Aug. 1, 2023, Dated: Nov. 6, 2023.

\* cited by examiner

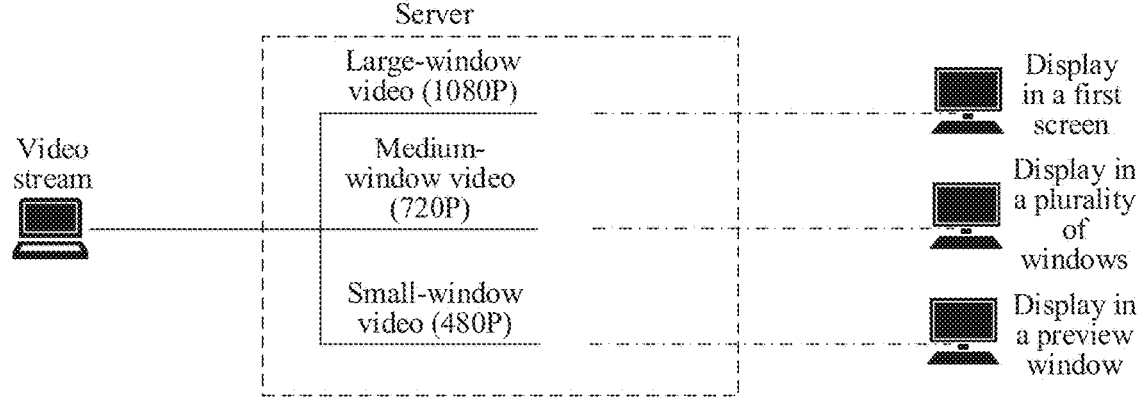
FIG. 4
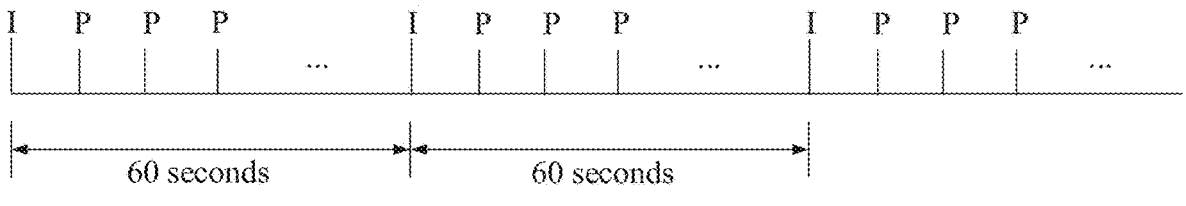
FIG. 5
FIG. 6

| | |
|---|---|
| I | The i frame is put in a queue |
| P  I | The first p frame is put in the queue |
| P... P  I | One i frame and a plurality of p frames |
| | Clear data |
| I | A next i frame comes, and is put in the queue |
| ... I | Repeat |

200

Apparatus for sending
video data

First sending
module — 201

Second sending
module — 202

Third sending
module — 203

METHOD AND APPARATUS FOR SENDING VIDEO DATA, AND ELECTRONIC DEVICE

CROSS-REFERENCE TO RELATED APPLICATIONS

This application is a Bypass Continuation Application of PCT International Application No. PCT/CN2023/110478 filed on Aug. 1, 2023, which claims priority to Chinese Patent Application No. 202210930148.X, filed in China on Aug. 3, 2022, which is incorporated herein by reference in its entirety.

TECHNICAL FIELD

This application relates to the field of video technologies, and in particular, to a method and an apparatus for sending video data, and an electronic device.

BACKGROUND

Currently, during video encoding, a video stream is encoded to generate an I frame and a P frame for transmission. The I frame, also referred to as an intra-frame encoded frame, is an independent frame with all information, and can be independently decoded without reference to another picture frame. The P frame, also referred to as an inter-frame prediction encoded frame, needs to be decoded with reference to the I frame. An amount of information in the I frame is much greater than an amount of information in the P frame.

In a video watching scenario, a server usually needs to deliver a same video stream to a plurality of users for watching. The server generates a plurality of pieces of same encoded data by using an encoder, and respectively delivers the plurality of pieces of encoded data to the plurality of users for decoding and watching. Currently, each time a watching user is newly added, the server generates an I frame through encoding by using the encoder, and delivers the I frame to all the users. When a plurality of users are newly added in short duration, a plurality of I frames are collectively generated by using the encoder and delivered to all the users. As a result, an amount of data delivered to each user in the short duration is large, easily resulting in network congestion, and even resulting in a black screen or freezing.

SUMMARY

According to a first aspect, an embodiment of this application provides a method for sending video data. The method includes:

encoding a video stream by using a first encoder in a server, to generate first encoded data, and sending the first encoded data to at least one first user equipment;

in a case that the server receives a first video display request corresponding to the first encoded data and sent by a second user equipment, encoding the video stream by using a second encoder, to generate second encoded data, and sending the second encoded data to the second user equipment; and in a case that the first encoded data satisfies a preset condition, sending the first encoded data to the second user equipment, continuing to send the first encoded data to the at least one first user equipment, and stopping sending the second encoded data to the second user equipment.

According to a second aspect, an embodiment of this application provides an apparatus for sending video data. The apparatus includes:

a first sending module, configured to encode a video stream by using a first encoder in a server, to generate first encoded data, and send the first encoded data to at least one first user equipment;

a second sending module, configured to: in a case that the server receives a first video display request corresponding to the first encoded data and sent by a second user equipment, encode the video stream by using a second encoder, to generate second encoded data, and send the second encoded data to the second user equipment; and a third sending module, configured to: in a case that the first encoded data satisfies a preset condition, send the first encoded data to the second user equipment, continue to send the first encoded data to the at least one first user equipment, and stop sending the second encoded data to the second user equipment.

According to a third aspect, an embodiment of this application provides an electronic device. The electronic device includes a processor and a memory. The memory stores a program or instructions executable on the processor. When the program or instructions are executed by the processor, steps of the method for sending video data in the first aspect is implemented.

According to a fourth aspect, an embodiment of this application provides a readable storage medium. The readable storage medium stores a program or instructions. When the program or instructions are executed by a processor, steps of the method for sending video data in the first aspect is implemented.

According to a fifth aspect, an embodiment of this application provides a chip. The chip includes a processor and a communication interface. The communication interface is coupled to the processor, and the processor is configured to run a program or instructions, to implement the method in the first aspect.

According to a sixth aspect, an embodiment of this application provides a computer program/program product. The computer program/program product is stored in a storage medium, and the computer program/program product is executed by at least one processor to implement the method in the first aspect.

BRIEF DESCRIPTION OF THE DRAWINGS

FIG. 4 is a schematic diagram of delivering a video stream in a conference scenario according to an embodiment of this application;

FIG. 5 is a schematic diagram 3 of encoded data according to an embodiment of this application;

FIG. 6 is a schematic diagram of an encoder according to an embodiment of this application;

DETAILED DESCRIPTION

The following clearly describes the technical solutions in embodiments of this application with reference to the accompanying drawings in the embodiments of this application. It is clear that the described embodiments are a part but not all of the embodiments of this application. All other embodiments obtained by a person of ordinary skill in the art based on the embodiments of this application shall fall within the protection scope of this application.

The terms "first", "second", and the like in the specification and the claims of this application are intended to distinguish between similar objects, instead of describing a particular sequence or order. It should be understood that the data used in this way is interchangeable in a proper case, so that the embodiments of this application can be implemented in a sequence other than the sequence illustrated or described herein. In addition, objects distinguished by "first", "second", and the like are usually of one type, and a quantity of objects is not limited. For example, there may be one or more first objects. In addition, "and/or" in the specification and the claims represents at least one of connected objects. The character "/" usually indicates an "or" relationship between associated objects.

The following describes in detail a method and an apparatus for sending video data, and an electronic device that are provided in the embodiments of this application with reference to the accompanying drawings by using specific embodiments and application scenarios of the embodiments.

Figures 1, 2, 3:
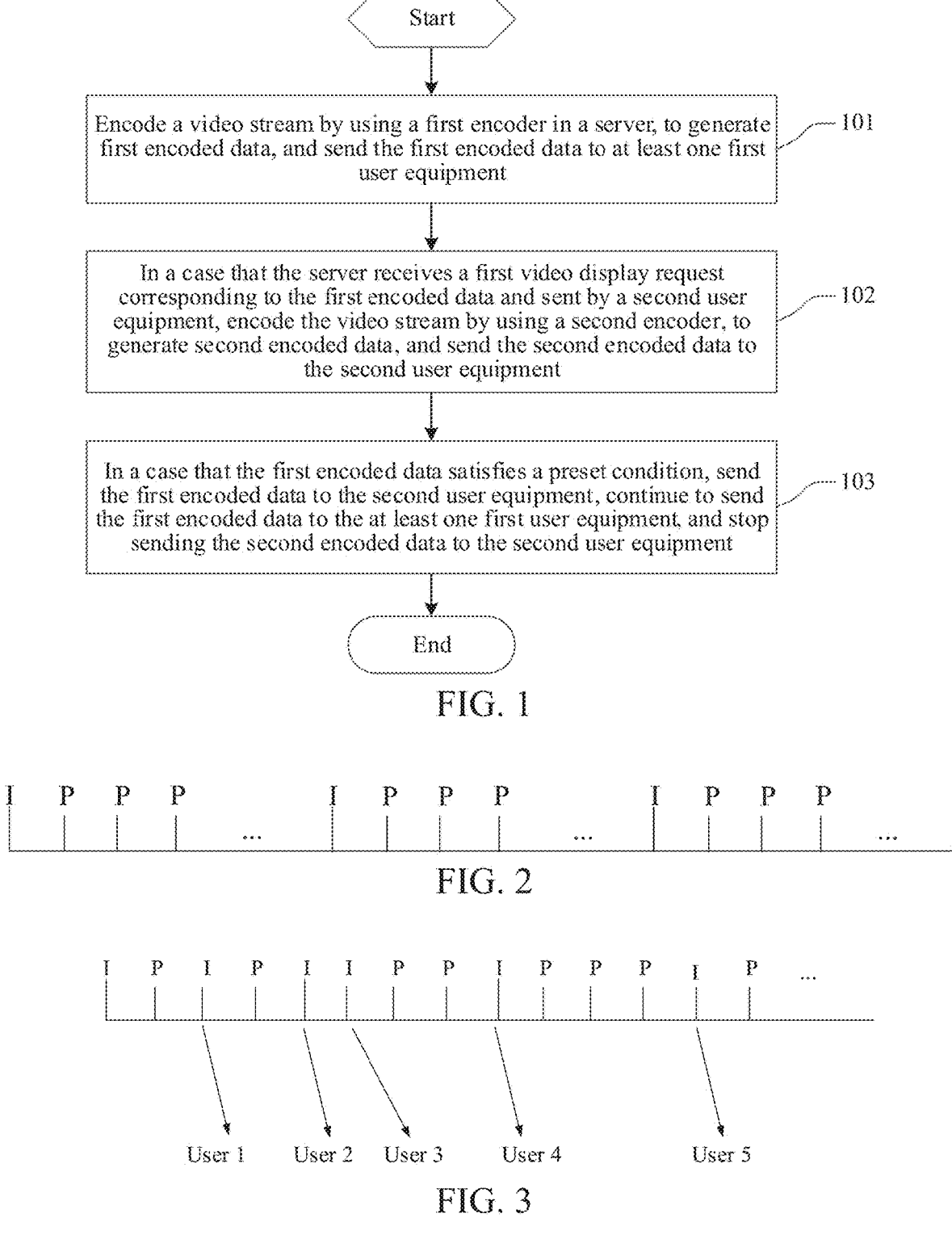
FIG. 1 is a flowchart of a method for sending video data according to an embodiment of this application.
FIG. 2 is a schematic diagram 1 of encoded data according to an embodiment of this application.
FIG. 3 is a schematic diagram 2 of encoded data according to an embodiment of this application.

FIG. 1 is a flowchart of a method for sending video data according to an embodiment of this application. As shown in FIG. 1, the method includes the following steps.

Step 101: Encode a video stream by using a first encoder in a server, to generate first encoded data, and send the first encoded data to at least one first user equipment.

The first encoder may be a 1080 P encoder, a 720 P encoder, a 480 P encoder, or the like. This is not limited in this embodiment. The 1080 P encoder is configured to generate a high-definition video stream with a resolution of 1080 P, the 720 P encoder is configured to generate a quasi-high-definition video stream with a resolution of 720 P, and the 480 P encoder is configured to generate a standard-definition video stream with a resolution of 480 P.

In addition, the method for sending video data in this embodiment of this application may be performed by the server.

In addition, the first encoder may be configured to generate the first encoded data based on the video stream at preset time intervals, and the first encoded data may include I-frame data and P-frame data.

Step 102: In a case that the server receives a first video display request corresponding to the first encoded data and sent by a second user equipment, encode the video stream by using a second encoder, to generate second encoded data, and send the second encoded data to the second user equipment.

There may be one or more second encoders. There may be one or more second user equipments. The second encoder may be configured to generate I-frame data based on the video stream in a case that a video display request is received, and deliver the I-frame data to the second user equipment, so that the second user equipment can display a video picture based on the I-frame data.

In addition, the second encoder may be a 1080 P encoder, a 720 P encoder, a 480 P encoder, or the like. This is not limited in this embodiment. In an implementation, a resolution of a picture generated through encoding by the second encoder is less than a resolution of a picture generated through encoding by the first encoder.

In an implementation, there may be one or more second user equipments, and there may be one second encoder. For a video display request of each second user equipment, the second encoder may generate I-frame data based on the video stream in a case that the video display request of each second user equipment is received, and deliver the I-frame data to the second user equipment, so that the second user equipment can display a video picture based on the delivered I-frame data.

In another implementation, there may be one or more second user equipments, and there may be a plurality of second encoders. For a video display request of each second user equipment, a second encoder configured to generate I-frame data based on the video display request may be selected from the plurality of second encoders. The selected second encoder may be a second encoder that generates an I frame last time before duration longer than the preset duration. The preset duration may be set in advance. For example, the preset duration may be 2 s, 5 s, or 30 s. This is not limited in this embodiment.

It should be noted that the second encoder may also be referred to as a policy encoder.

Step 103: In a case that the first encoded data satisfies a preset condition, send the first encoded data to the second user equipment, continue to send the first encoded data to the at least one first user equipment, and stop sending the second encoded data to the second user equipment.

That the first encoded data satisfies a preset condition may be that the first encoder generates I-frame data next to first I-frame data. In addition, a time point at which the first video display request is received is between a time point at which the first I-frame data is generated and a time point at which the I-frame data next to the first I-frame data is generated.

In an implementation, the first encoder is configured to generate the first encoded data based on the video stream at the preset time intervals. The first encoded data includes I-frame data and P-frame data. The second encoder is configured to generate I-frame data based on the video stream in the case that a video display request is received. In this way, the second encoder generates the I-frame data based on the video display request, so that the first encoder can be prevented from frequently generating the I-frame data based on the video display request and delivering the I-frame data to all users, and the I-frame data is not collectively delivered to all the users in short duration, thereby reducing a probability of a black screen or freezing caused by network congestion.

The preset time interval may be set in advance. For example, the preset duration may be 5 s, 10 s, or 30 s. This is not limited in this embodiment. In an implementation, the first encoder may be configured to generate I-frame data based on the video stream at preset time intervals.

In addition, the I-frame data may be referred to as an I frame for short, and the P-frame data may be referred to as a P frame for short.

It should be understood that, in the field of video encoding, which is basically H264 or H265 encoding, concepts of the I frame and the P frame are usually involved in encoding and decoding. The I frame, also referred to as an intra-frame encoded frame, is an independent frame with all information, can be independently decoded without reference to another picture, and may be simply understood as a static picture. The P frame, also referred to as an inter-frame prediction encoded frame, needs to be encoded with reference to the foregoing I frame. As shown in FIG. 2, a complete compressed video includes a plurality of I frames and a plurality of P frames. Because the P frame needs to be decoded with reference to the I frame, a complete I frame needs to be received to watch a picture and correctly decode a subsequent P frame. The I frame is larger, and is generally more than 3 times of the P frame.

In the related art, as shown in FIG. 3, when a plurality of users are newly added in short duration, a plurality of I frames are collectively generated by using the encoder and delivered to all the users. As a result, an amount of data delivered to each user in the short duration is large, easily resulting in network congestion.

It should be noted that a video bit rate is a quantity of bits of data transmitted per unit time during data transmission, and is generally in a unit of kbps, that is, kilobit per second. In this embodiment of this application, a video bit rate of the first encoder always remains unchanged, so that a case that the first encoder generates a plurality of I frames in short duration due to factors such as a plurality of user requests and switching a watched video stream, resulting in an increase in transmission traffic in the short duration, causing network congestion and severe packet loss, and further resulting in freezing of a picture watched by a user is avoided, thereby achieving smooth experience of watching the video stream.

In this embodiment of this application, the video stream is encoded by using the first encoder in the server, to generate the first encoded data, and the first encoded data is sent to the at least one first user equipment; in the case that the server receives the first video display request corresponding to the first encoded data and sent by the second user equipment, the video stream is encoded by using the second encoder, to generate the second encoded data, and the second encoded data is sent to the second user equipment; and in the case that the first encoded data satisfies the preset condition, the first encoded data is sent to the second user equipment, the first encoded data continues to be sent to the at least one first user equipment, and the second encoded data stops being sent to the second user equipment. In this way, when the first video display request of the second user equipment for the encoded data of the first encoder is received, the second encoded data is delivered to the second user equipment by using the second encoder, to prevent the first encoder from collectively generating I-frame data because a plurality of user equipments are newly added in short duration. In addition, in the case that the first encoded data satisfies the preset condition, a source of video data for the second user equipment is switched from the second encoder to the first encoder, to avoid a case that the second encoder collectively delivers I-frame data to a large quantity of users because the plurality of user equipments are newly added. Therefore, an amount of data delivered to the user equipments in the short duration because the user equipments are newly added can be reduced, and a probability of a black screen or freezing caused by network congestion can be reduced.

Optionally, the encoding a video stream by using a first encoder in a server, to generate first encoded data includes:

encoding the video stream by using the first encoder in the server, to generate the first I-frame data and a plurality of pieces of P-frame data corresponding to the first I-frame data, where the first encoder is configured to generate I-frame data based on the video stream at the preset time intervals.

The in a case that the first encoded data satisfies a preset condition, sending the first encoded data to the second user equipment includes:

in a case that the I-frame data next to the first I-frame data is generated by using the first encoder, sending the first encoded data to the second user equipment.

The time point at which the first video display request is received is between the time point at which the first I-frame data is generated and the time point at which the I-frame data next to the first I-frame data is generated.

In an implementation, the video stream may be encoded by using the first encoder in the server, to generate the first I-frame data. The first I-frame data is an $N^{th}$ piece of I-frame data encoded by the first encoder, and N is a positive integer. In a case that an $(N+1)^{th}$ piece of I-frame data is generated by using the first encoder, the first encoded data is sent to the second user equipment, and the first encoded data continues to be sent to the at least one first user equipment. The $(N+1)^{th}$ piece of I-frame data is the I-frame data next to the first I-frame data. N and N+1 may be numbers of I-frame data generated by using the first encoder, and the $(N+1)^{th}$ piece of I-frame data is the I-frame data next to the $N^{th}$ piece of I-frame data.

The first encoder may generate I-frame data based on the video stream at the preset time intervals. In a case that a video display request sent by a user equipment is received, the time interval at which the first encoder generates the I-frame data remains unchanged. For example, the first encoder may generate an I frame every 60 seconds, which is not changed due to a request of a new user.

It should be noted that, between generating the first I-frame data by using the first encoder and generating the I-frame data next to the first I-frame data by using the first encoder, the first video display request corresponding to the first encoded data and sent by the second user equipment is received. The second encoder generates I-frame data and delivers the I-frame data to the second user equipment. When the first encoder generates the I-frame data next to the first I-frame data, the source of the video data for the second user equipment is switched from the second encoder to the first encoder. The first encoded data is sent to the second user equipment, the first encoded data continues to be sent to the at least one first user equipment, and the second encoded data stops being sent to the second user equipment.

In this implementation, in the case that the I-frame data next to the first I-frame data is generated by using the first encoder, the first encoded data is sent to the second user equipment, the first encoded data continues to be sent to the at least one first user equipment, and the second encoded data stops being sent to the second user equipment, so that when the first encoder generates I-frame data at the preset time intervals, the source of the video data for the second user equipment can be switched from the second encoder to the first encoder, and the video data for the second user equipment can be synchronized with video data for the at least one first user equipment.

Optionally, the encode the video stream by using a second encoder, to generate second encoded data includes:

generating the second encoded data that includes second I-frame data and that is of preset duration.

The method further includes:

caching the second encoded data of the preset duration; and in a case that the server receives a second video display request corresponding to the first encoded data and sent by a third user equipment, if duration between a time point at which the second video display request is received and a time point at which the second I-frame data is generated is shorter than the preset duration, sending the cached second encoded data to the third user equipment.

The preset duration may be set in advance. For example, the preset duration may be 2 s, 5 s, or 30 s. This is not limited in this embodiment.

In an implementation, when the server receives the first video display request from the second user equipment, an I frame is generated by using the second encoder. In addition, if duration between the first video display request and the second video display request is shorter than the preset duration, the second encoder does not generate the I frame for the second video display request. In other words, minimum duration between generating I frames by the second encoder is not shorter than the preset duration. For the second video display request, the cached second encoded data is sent to the third user equipment.

In an implementation, the cached second encoded data includes the second I-frame data and at least one piece of P-frame data corresponding to the second I-frame data, so that the third user equipment can display a video picture based on the cached I-frame data and the P-frame data.

In addition, when no video display request from a user equipment is received, the second encoder may generate an I frame at fixed intervals. For example, the second encoder may generate an I frame every 60 seconds.

It should be noted that, in the case that the second video display request corresponding to the first encoded data and sent by the third user equipment is received, if the duration between the time point at which the second video display request is received and the time point at which the second I-frame data is generated is longer than or equal to the preset duration, I-frame data next to the second I-frame data is generated by using the second encoder, and the I-frame data next to the second I-frame data is sent to the third user equipment.

It should be noted that, in different use scenarios, a value of the preset duration may be set to different values. For example, in a use scenario in which a requirement on video smoothness is high, the value of the preset duration may be set to a small value, for example, set to 2 s. In a use scenario in which a requirement on video smoothness is low, the value of the preset duration may be set to a large value, for example, set to 60 s.

In this implementation, the second encoded data of the preset duration is cached. In the case that the server receives the second video display request corresponding to the first encoded data and sent by the third user equipment, if the duration between the time point at which the second video display request is received and the time point at which the second I-frame data is generated is shorter than the preset duration, the cached second encoded data is sent to the third user equipment. In this way, when duration from a time point at which the second encoder generates an I frame last time is small, the cached second encoded data is delivered to a new user equipment, to further prevent the second encoder from collectively generating and delivering the I-frame data, so that a probability of a black screen or freezing caused by network congestion can be further reduced.

Optionally, after the second encoded data of the preset duration is cached, the method further includes:

in a case that the I-frame data next to the second I-frame data is generated by using the second encoder, replacing the cached second encoded data based on the I-frame data next to the second I-frame data.

The second I-frame data may be an Mth piece of I-frame data generated through encoding by the second encoder, the I-frame data next to the second I-frame data is an $(M+1)^{th}$ piece of I-frame data generated through encoding by the second encoder, and M is a positive integer. The cached second encoded data may include the second I-frame data and at least one piece of P-frame data corresponding to the second I-frame data. In the case that the I-frame data next to the second I-frame data is generated by using the second encoder, the cached second encoded data may be cleared, the generated I-frame data next to the second I-frame data and at least one piece of P-frame data corresponding to the I-frame data next to the second I-frame data are cached, and so on, to update and replace the cached second encoded data. Duration of the cached second encoded data is the preset duration.

It should be noted that the I-frame data generated by using the second encoder may be stored in a cache queue, and the P-frame data generated immediately after may also be stored in the cache queue. The cache queue may cache data of the preset duration. For example, the cache queue may include one I-frame and a plurality of P-frames. After the cached data reaches the preset duration, all the data in the cache queue is cleared until a next I frame is generated, and the foregoing process of storing the data in the cache queue is repeated.

It should be noted that M and M+1 may be numbers of I-frame data generated by using the second encoder, and the Mth piece of I-frame data is previous I-frame data of the $(M+1)^{th}$ piece of I-frame data.

In this implementation, in the case that the I-frame data next to the second I-frame data is generated by using the second encoder, the cached second encoded data is replaced based on the I-frame data next to the second I-frame data, so that in a case that the second encoder generates the I-frame data, the cached I-frame data is replaced with the newly generated I-frame data, to continuously update the cached I-frame data.

Optionally, after the cached second encoded data is sent to the third user equipment, the method further includes:

in a case that duration after the second I-frame data is generated satisfies the preset duration, generating the I-frame data next to the second I-frame data by using the second encoder; and in a case that the I-frame data next to the second I-frame data is generated, sending the second encoded data to the third user equipment, and stopping sending the cached second encoded data to the third user equipment.

In an implementation, the second I-frame data may be an Mth piece of I-frame data generated through encoding by the second encoder. In the case that the duration after the Mth piece of I-frame data is generated satisfies the preset duration, an $(M+1)^{th}$ piece of I-frame data is generated by using the second encoder. In the case that the $(M+1)^{th}$ piece of I-frame data is generated, the second encoded data is sent to the third user equipment, and the cached second encoded data stops being sent to the third user equipment.

In a case that duration between a current time point and the time point at which the second I-frame data is generated is longer than or equal to the preset duration, the I-frame data next to the second I-frame data is generated by using the second encoder. In the case that the I-frame data next to the second I-frame data is generated, the I-frame data next to the second I-frame data is delivered to the third user equipment. A video stream subsequently delivered to the third user equipment is directly generated by using the second encoder, and is no longer data in the cache queue.

In this implementation, in the case that the duration after the second I-frame data is generated satisfies the preset duration, the I-frame data next to the second I-frame data is generated by using the second encoder; and in the case that the I-frame data next to the second I-frame data is generated, the second encoded data is sent to the third user equipment, and the cached second encoded data stops being sent to the third user equipment. In this way, a source of video data for the third user equipment is switched from the cache queue to the second encoder, and the video data for the second user equipment is synchronized with the video data for the third user equipment.

Optionally, the in a case that the first encoded data satisfies a preset condition, send the first encoded data to the second user equipment, continue to send the first encoded data to the at least one first user equipment, and stop sending the second encoded data to the second user equipment includes:

in the case that the I-frame data next to the first I-frame data is generated by using the first encoder, sending the first encoded data to the second user equipment and the third user equipment, continuing to send the first encoded data to the at least one first user equipment, and stopping sending the second encoded data to the third user equipment and the second user equipment.

Both the time point at which the first video display request is received and the time point at which the second video display request is received are between the time point at which the first I-frame data is generated and the time point at which the I-frame data next to the first I-frame data is generated.

Between generating the first I-frame data by using the first encoder and generating the I-frame data next to the first I-frame data by using the first encoder, the first video display request corresponding to the first encoded data and sent by the second user equipment is received, and the second encoder generates the second I-frame data and delivers the second I-frame data to the second user equipment. Between generating the second I-frame data by using the second encoder and generating the I-frame data next to the second I-frame data by using the second encoder, the second video display request corresponding to the first encoded data and sent by the third user equipment is received, and the cached second I-frame data is delivered to the third user equipment. In the case that the duration after the second I-frame data is generated satisfies the preset duration, the I-frame data next to the second I-frame data is generated by using the second encoder, the second encoded data is sent to the third user equipment and the second user equipment, and the cached second encoded data stops being sent to the third user equipment. In the case that the I-frame data next to the first I-frame data is generated by using the first encoder, the first encoded data is sent to the second user equipment, the third user equipment, and the at least one first user equipment, and the second encoded data stops being sent to the third user equipment and the second user equipment.

In addition, the preset duration may be shorter than the preset time interval at which the first encoder generates the I-frame data. The time point at which the second video display request is received is between the time point at which the second I-frame data is generated and a time point at which the I-frame data next to the second I-frame data is generated.

In this implementation, in the case that the I-frame data next to the first I-frame data is generated by using the first encoder, the first encoded data is sent to the second user equipment and the third user equipment, the first encoded data continues to be sent to the at least one first user equipment, and the second encoded data stops being sent to the second user equipment and the third user equipment, so that when the first encoder generates I-frame data at the preset time intervals, the sources of the video data for the second user equipment and the third user equipment can be switched from the second encoder to the first encoder, and the video data for the second user equipment, the third user equipment and the at least one first user equipment can be synchronized.

The method for sending video data is described below by using a specific embodiment.

This embodiment is a conference scenario. A server delivers video streams of different definition to users based on a watching scenario of each user. As shown in FIG. 4 below, when a video, for example, a shared video stream, is displayed in a first screen of a user, the server delivers a video stream of 1080 P (that is, a large-window video) to the user. When the video is displayed in one of a plurality of windows of a user, the server delivers a video stream of 720 P (that is, a medium-window video) to the user. When the video is displayed in a preview window of a user, the server delivers a video stream of 480 P (that is, a small-window video) to the user.

In this embodiment, three encoders, namely, a 1080 P encoder, a 720 P encoder, and a 480 P encoder, are disposed in the server. After each video stream is uploaded to the server, as shown in FIG. 5, each encoder generates an I frame at fixed intervals. For example, each encoder generates an I frame every 60 seconds, which is not changed due to a request of a new user.

In this embodiment, a policy encoder is newly added to the server. The policy encoder may be considered as the second encoder in the embodiment of FIG. 1. The policy encoder may be a 480 P encoder. Different from the encoder that generates an I frame at the fixed intervals, the policy encoder generates an I frame when receiving a user request, and does not generate an I frame for a next user request when duration between the two user requests is shorter than preset duration. In other words, minimum duration between generating I frames by the policy encoder cannot be shorter than the preset duration. When no user request is received, the policy encoder may generate an I frame at fixed intervals. For example, the policy encoder may generate an I frame every 60 seconds.

As shown in FIG. 6, the policy encoder may be designed as follows. Encoded data encoded by the policy encoder is divided into two parts. A first video stream is not cached, and is directly delivered to a client of a user for rendering and presentation. A second video stream is stored in a cache queue of the server. Generated I-frame data and P-frame data are sequentially cached, and when duration between two user requests is shorter than the preset duration, the video stream in the cache queue is delivered to a user for a later user request.

Figure 7:
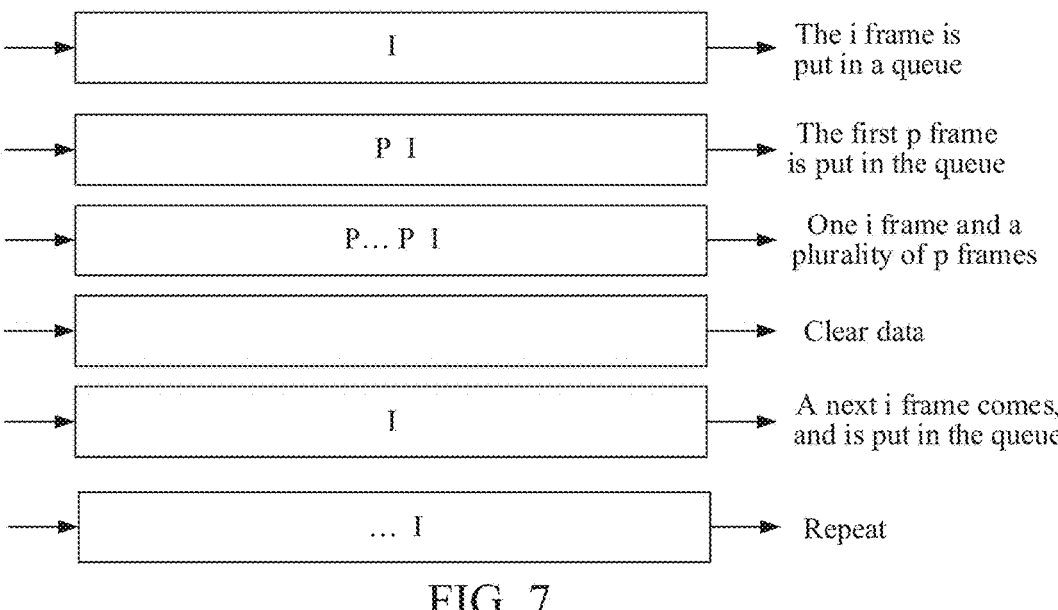
FIG. 7 is a schematic diagram of caching data according to an embodiment of this application.

In addition, as shown in FIG. 7, the cache queue may be designed as follows. After the policy encoder generates an I frame, timing starts. Encoded data generated by the policy encoder is directly delivered to a plurality of users, the generated I-frame data is simultaneously stored in the cache queue, and a P frame generated immediately after is also stored in the cache queue. The cache queue may cache data of the preset duration, for example, may include one I frame and a plurality of P frames. After the cached data reaches the preset duration, all the data in the cache queue is cleared until a next I frame is generated, and the foregoing process of storing the data in the cache queue is repeated.

Figure 8:
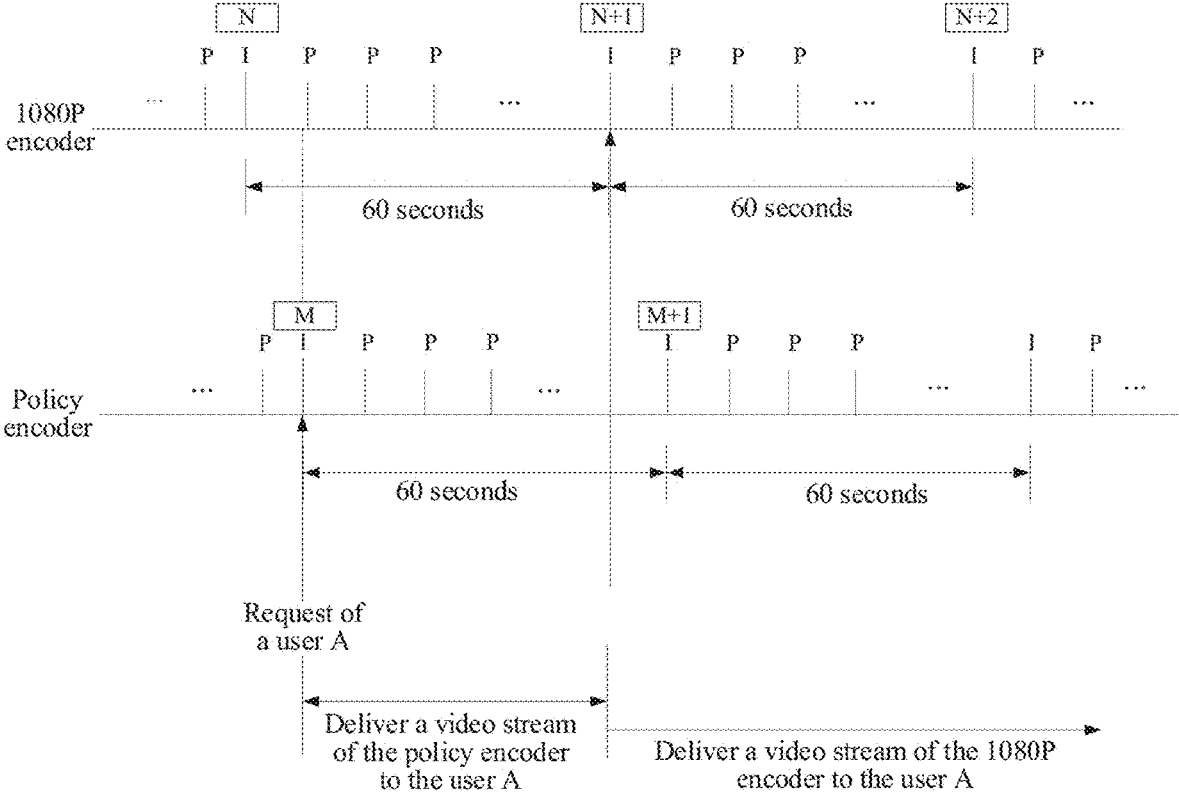
FIG. 8 is a schematic diagram 1 of sending video data according to an embodiment of this application.

This embodiment may be used in a scenario in which a user enters a conference to watch a shared video. An encoder used for a shared video stream may be the 1080 P encoder, and the 1080 P encoder may be considered as the first encoder in the embodiment of FIG. 1. In this embodiment, a user A enters the conference and enters a first screen to watch a shared screen of another user. From a time point at which the user A enters the first screen to a time point at which the user A views a picture, a running principle of an entire system is shown in FIG. 8. When the user A enters the first screen, a client used by the user A initiates, to the server, an action of requesting to deliver a video stream. After the request of the user A reaches the server, the server does not directly deliver a video stream of the 1080 P encoder, but enables the policy encoder to immediately generate an I frame numbered M and directly deliver the I frame to the user A. After receiving data of the entire I frame, the user A can immediately view a 480 P standard-definition video picture. Then the policy encoder continuously delivers a P frame generated by the policy encoder to the user A. The client of the user A decodes the P frame based on the previously received I frame, and performs rendering to form a video stream. After generating an I frame numbered N+1, the 1080 P encoder delivers the I frame numbered N+1 to the user A, and video streams subsequently delivered to the user A are all generated by the 1080 P encoder. In this case, the shared video stream watched by the user A changes from a standard-definition video stream encoded by the policy encoder to a high-definition video stream encoded by the 1080 P encoder.

In this embodiment, a video bit rate of the 1080 P encoder remains unchanged. Similar to that of the 1080 P encoder, video bit rates of the 480 P encoder and the 720 P encoder also remain unchanged. Therefore, a case that the 480 P encoder, the 720 P encoder, or the 1080 P encoder generates a plurality of I frames in short duration due to factors such as entering the conference by a plurality of user and switching a watched video stream, resulting in an increase in transmission traffic in the short duration, causing network congestion and severe packet loss, and further resulting in freezing of a picture watched by a user is avoided.

Figures 9, 10:
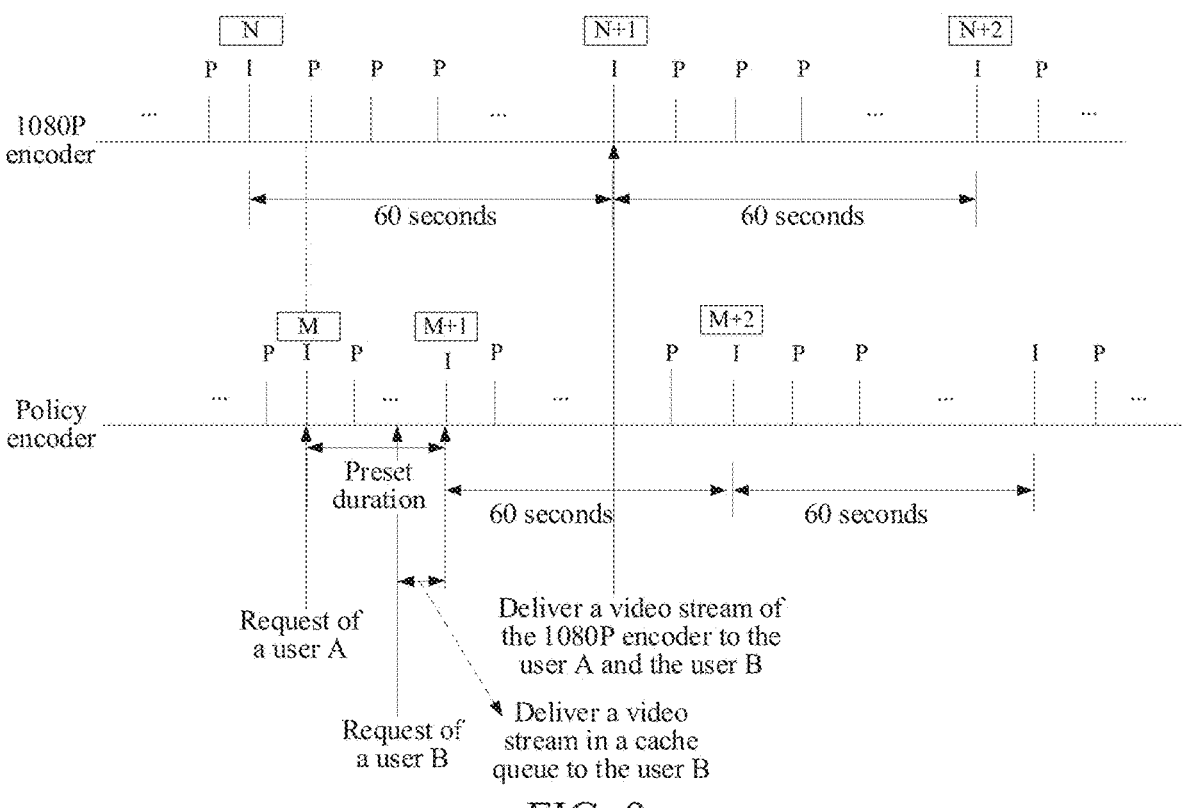
FIG. 9 is a schematic diagram 2 of sending video data according to an embodiment of this application.
FIG. 10 is a schematic diagram of a structure of an apparatus for sending video data according to an embodiment of this application.

Further, as shown in FIG. 9, after the user A enters the conference, a user B also enters the conference after duration shorter than the preset duration, for example, less than 2s. When entering the first screen, the user B initiates, to the server, an action of requesting the shared video stream. After the request of the user B reaches the server, the server does not directly deliver the video stream of the 1080 P encoder to the user B. Because if a delivered first frame is a P frame, a client of the user cannot decode the video stream. In a case that the server detects that duration after the policy encoder generates an I frame last time is shorter than the preset duration, the server delivers, to the user B, video data stored in the cache queue by the policy encoder, until detecting that the duration after the policy encoder generates an I frame last time is equal to the preset duration. In a case that the server detects that the duration after the policy encoder generates an I frame last time is equal to the preset duration, the server generates an I frame numbered M+1 by using the policy encoder, and delivers the I frame numbered M+1 to the user B. A video stream subsequently delivered to the user B is directly generated by the policy encoder, and is no longer the data in the cache queue. After the 1080 P encoder generates an I frame, the video stream delivered to the user B is generated by the 1080 P encoder. In this case, similar to the user A, the shared video stream watched by the user B changes from a standard-definition video stream encoded by the policy encoder to a high-definition video stream encoded by the 1080 P encoder.

In this embodiment, smooth experience of watching the video stream in the conference scenario can be achieved.

The method for sending video data provided in this embodiment of this application may be performed by an apparatus for sending video data. In the embodiments of this application, the apparatus for sending video data provided in the embodiments of this application is described by using an example in which the apparatus for sending video data performs the method for sending video data.

FIG. 10 is a schematic diagram of a structure of an apparatus for sending video data according to an embodiment of this application. As shown in FIG. 10, the apparatus 200 for sending video data includes:

a first sending module 201, configured to encode a video stream by using a first encoder in a server, to generate first encoded data, and send the first encoded data to at least one first user equipment;

a second sending module 202, configured to: in a case that the server receives a first video display request corresponding to the first encoded data and sent by a second user equipment, encode the video stream by using a second encoder, to generate second encoded data, and send the second encoded data to the second user equipment; and a third sending module 203, configured to: in a case that the first encoded data satisfies a preset condition, send the first encoded data to the second user equipment, continue to send the first encoded data to the at least one first user equipment, and stop sending the second encoded data to the second user equipment.

Optionally, the first sending module is specifically configured to:

encode the video stream by using the first encoder in the server, to generate the first I-frame data and a plurality of pieces of P-frame data corresponding to the first I-frame data, where the first encoder is configured to generate I-frame data based on the video stream at the preset time intervals.

The third sending module is specifically configured to:

in a case that I-frame data next to the first I-frame data is generated by using the first encoder, send the first encoded data to the second user equipment, where a time point at which the first video display request is received is between a time point at which the first I-frame data is generated and a time point at which the I-frame data next to the first I-frame data is generated; and continue to send the first encoded data to the at least one first user equipment, and stop sending the second encoded data to the second user equipment.

Optionally, the second sending module is specifically configured to:

in the case that the server receives the first video display request corresponding to the first encoded data and sent by the second user equipment, encode the video stream by using the second encoder, to generate the second encoded data that includes second I-frame data and that is of preset duration.

The apparatus further includes:

a caching module, configured to cache the second encoded data of the preset duration; and a fourth sending module, configured to: in a case that the server receives a second video display request corresponding to the first encoded data and sent by a third user equipment, if duration between a time point at which the second video display request is received and a time point at which the second I-frame data is generated is shorter than the preset duration, send the cached second encoded data to the third user equipment.

In some embodiments, the apparatus further includes:

a replacement module, configured to: in a case that I-frame data next to the second I-frame data is generated by using the second encoder, replace the cached second encoded data based on the I-frame data next to the second I-frame data.

In some embodiments, the apparatus further includes:

a generation module, configured to: in a case that duration after the second I-frame data is generated satisfies the preset duration, generate I-frame data next to the second I-frame data by using the second encoder; and a fifth sending module, configured to: in a case that the I-frame data next to the second I-frame data is generated, send the second encoded data to the third user equipment, and stop sending the cached second encoded data to the third user equipment.

Optionally, the third sending module is specifically configured to:

in the case that the I-frame data next to the first I-frame data is generated by using the first encoder, send the first encoded data to the second user equipment and the third user equipment, continue to send the first encoded data to the at least one first user equipment, and stop sending the second encoded data to the third user equipment and the second user equipment.

Both the time point at which the first video display request is received and the time point at which the second video display request is received are between the time point at which the first I-frame data is generated and the time point at which the I-frame data next to the first I-frame data is generated.

In this embodiment of this application, the first sending module encodes the video stream by using the first encoder in the server, to generate the first encoded data, and sends the first encoded data to the at least one first user equipment. In the case that the server receives the first video display request corresponding to the first encoded data and sent by the second user equipment, the second sending module encodes the video stream by using the second encoder, to generate the second encoded data, and sends the second encoded data to the second user equipment. In the case that the first encoded data satisfies the preset condition, the third sending module sends the first encoded data to the second user equipment, continues to send the first encoded data to the at least one first user equipment, and stops sending the second encoded data to the second user equipment. In this way, when the first video display request of the second user equipment for the encoded data of the first encoder is received, the second encoded data is delivered to the second user equipment by using the second encoder, to prevent the first encoder from collectively generating I-frame data because a plurality of user equipments are newly added in short duration. In addition, in the case that the first encoded data satisfies the preset condition, a source of video data for the second user equipment is switched from the second encoder to the first encoder, to avoid a case that the second encoder collectively delivers I-frame data to a large quantity of users because the plurality of user equipments are newly added. Therefore, an amount of data delivered to the user equipments in the short duration because the user equipments are newly added can be reduced, and a probability of a black screen or freezing caused by network congestion can be reduced.

The apparatus for sending video data in this embodiment of this application may be an electronic device, or may be a component, for example, an integrated circuit or a chip, in the electronic device. The electronic device may be a terminal, or may be a device other than the terminal. For example, the electronic device may be a mobile phone, a tablet computer, a notebook computer, a palmtop computer, a vehicle-mounted electronic device, a mobile Internet device (MID), an augmented reality (AR)/virtual reality (VR) device, a robot, a wearable device, an ultra-mobile personal computer (UMPC), a netbook, or a personal digital assistant (PDA), or may be a server, a network attached storage (NAS), a personal computer (PC), a television (TV), a teller machine, or an automated machine. This is not specifically limited in the embodiments of this application.

The apparatus for sending video data in this embodiment of this application may be an apparatus with an operating system. The operating system may be an Android operating system, an iOS operating system, or another possible operating system. This is not specifically limited in this embodiment of this application.

The apparatus for sending video data provided in this embodiment of this application can implement processes implemented in the method embodiment in FIG. 1. To avoid repetition, details are not described herein again.

Figure 11:
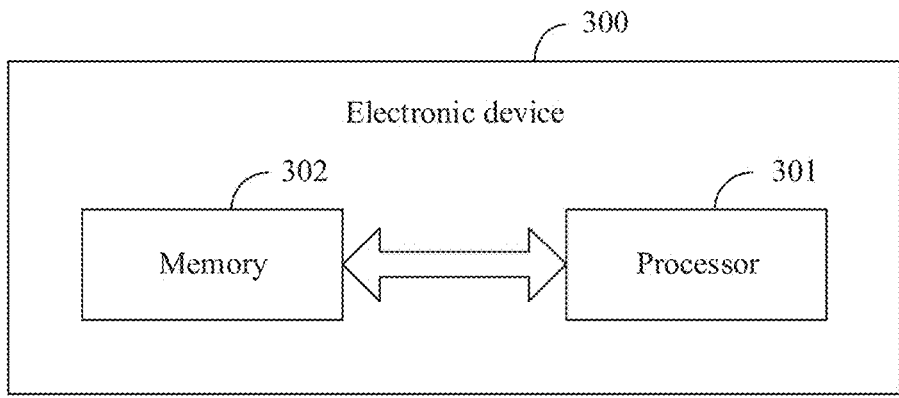
FIG. 11 is a schematic diagram 1 of a structure of an electronic device according to an embodiment of this application.

Optionally, as shown in FIG. 11, an embodiment of this application further provides an electronic device 300, including a processor 301 and a memory 302. The memory 302 stores a program or instructions executable on the processor 301. When the program or the instructions are executed by the processor 301, steps of the embodiment of the method for sending video data are implemented, and same technical effects can be achieved. To avoid repetition, details are not described herein again.

It should be noted that the electronic device in this embodiment of this application includes the foregoing described mobile electronic device and non-mobile electronic device.

Figure 12:
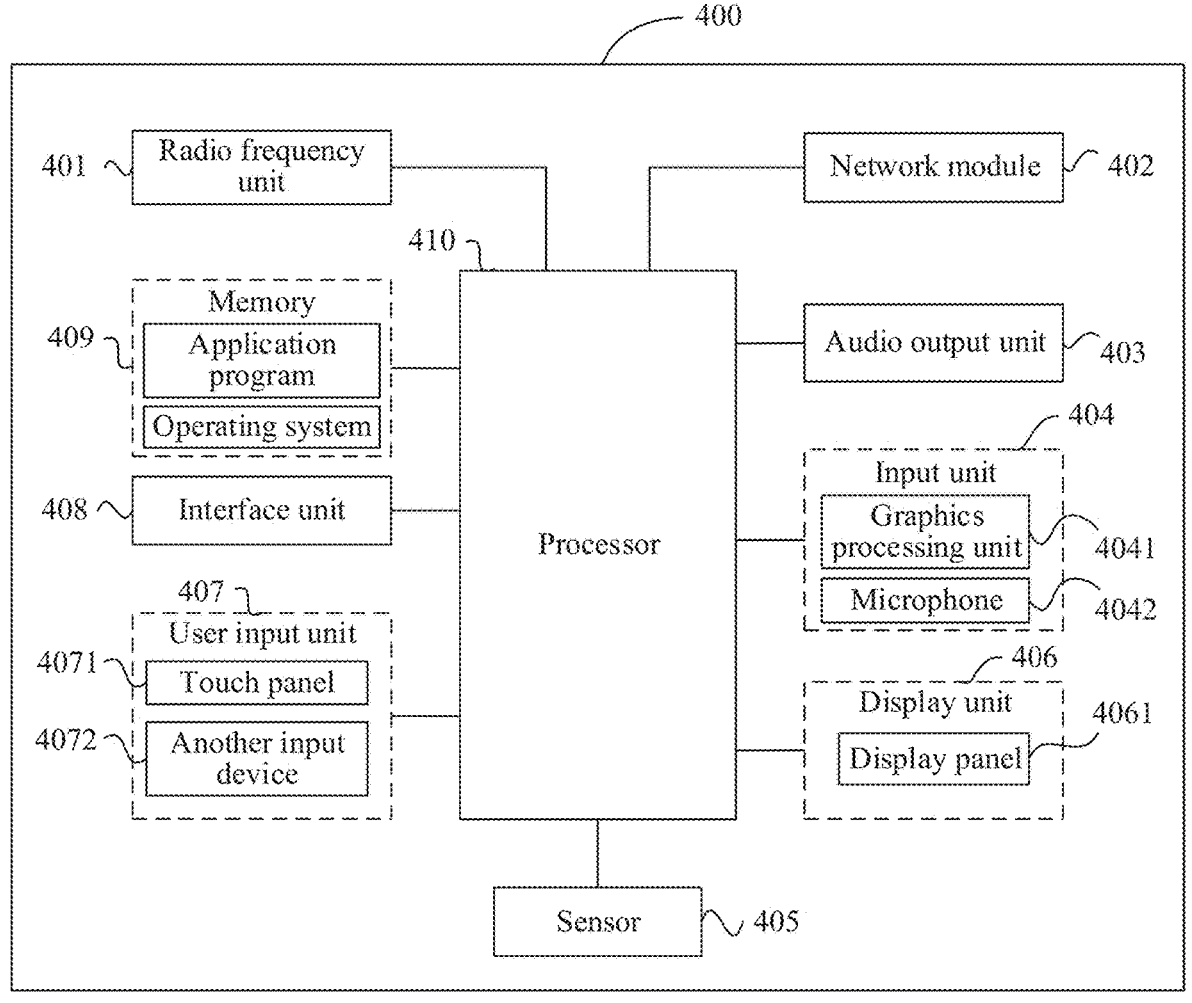
FIG. 12 is a schematic diagram 2 of a structure of an electronic device according to an embodiment of this application.

FIG. 12 is a schematic diagram of a hardware structure of an electronic device according to an embodiment of this application.

The electronic device 400 includes, but is not limited to, components such as a radio frequency unit 401, a network module 402, an audio output unit 403, an input unit 404, a sensor 405, a display unit 406, a user input unit 407, an interface unit 408, a memory 409, and a processor 410.

A person skilled in the art may understand that the electronic device 400 may further include a power supply (such as a battery) that supplies power to the components. The power supply may be logically connected to the processor 410 through a power supply management system, to implement functions such as charging, discharging, and power consumption management through the power supply management system. The structure of the electronic device shown in FIG. 12 constitutes no limitation on the electronic device, and the electronic device may include more or fewer components than those shown in the figure, or some components may be combined, or in different component arrangements. Details are not described herein.

The processor 410 is configured to encode a video stream by using a first encoder in a server, to generate first encoded data. The radio frequency unit 401 is configured to send the first encoded data to at least one first user equipment.

The processor 410 is further configured to: in a case that the server receives a first video display request corresponding to the first encoded data and sent by a second user equipment, encode the video stream by using a second encoder, to generate second encoded data. The radio frequency unit 401 is further configured to send the second encoded data to the second user equipment.

The radio frequency unit 401 is further configured to: in a case that the first encoded data satisfies a preset condition, send the first encoded data to the second user equipment, continue to send the first encoded data to the at least one first user equipment, and stop sending the second encoded data to the second user equipment.

Optionally, the processor 410 is further configured to:

encode the video stream by using the first encoder in the server, to generate the first I-frame data and a plurality of pieces of P-frame data corresponding to the first I-frame data, where the first encoder is configured to generate I-frame data based on the video stream at the preset time intervals.

The radio frequency unit 401 is further configured to: in a case that the I-frame data next to the first I-frame data is generated by using the first encoder, send the first encoded data to the second user equipment.

The time point at which the first video display request is received is between the time point at which the first I-frame data is generated and the time point at which the I-frame data next to the first I-frame data is generated.

Optionally, the processor 410 is further configured to generate the second encoded data that includes second I-frame data and that is of preset duration.

The processor 410 is further configured to cache the second encoded data of the preset duration.

The radio frequency unit 401 is further configured to: in a case that the server receives a second video display request corresponding to the first encoded data and sent by a third user equipment, if duration between a time point at which the second video display request is received and a time point at which the second I-frame data is generated is shorter than the preset duration, send the cached second encoded data to the third user equipment.

Optionally, the processor 410 is further configured to: in a case that the I-frame data next to the second I-frame data is generated by using the second encoder, replace the cached second encoded data based on the I-frame data next to the second I-frame data.

Optionally, the processor 410 is further configured to: in a case that duration after the second I-frame data is generated satisfies the preset duration, generate the I-frame data next to the second I-frame data by using the second encoder.

The radio frequency unit 401 is further configured to: in a case that the I-frame data next to the second I-frame data is generated, send the second encoded data to the third user equipment, and stop sending the cached second encoded data to the third user equipment.

Optionally, the radio frequency unit 401 is further configured to:

in the case that the I-frame data next to the first I-frame data is generated by using the first encoder, send the first encoded data to the second user equipment and the third user equipment, continue to send the first encoded data to the at least one first user equipment, and stop sending the second encoded data to the third user equipment and the second user equipment.

Both the time point at which the first video display request is received and the time point at which the second video display request is received are between the time point at which the first I-frame data is generated and the time point at which the I-frame data next to the first I-frame data is generated.

It should be understood that, in this embodiment of this application, the input unit 404 may include a graphics processing unit (GPU) 4041 and a microphone 4042. The graphics processing unit 4041 processes picture data of a static image or a video that is obtained by a picture capture apparatus (such as a camera) in a video capture mode or a picture capture mode. The display unit 406 may include a display panel 4061, and the display panel 4061 may be configured in a form such as a liquid crystal display or an organic light-emitting diode. The user input unit 407 includes at least one of a touch panel 4071 and another input device 4072. The touch panel 4071 is also referred to as a touchscreen. The touch panel 4071 may include two parts: a touch detection apparatus and a touch controller. The another input device 4072 may include, but is not limited to, a physical keyboard, a functional key (such as a volume control key or a switch key), a trackball, a mouse, and a joystick. Details are not described herein.

The memory 409 may be configured to store a software program and various data. The memory 409 may mainly include a first storage area for storing a program or instructions and a second storage area for storing data. The first storage area may store an operating system, an application program or instructions required by at least one function (for example, a sound playback function or a picture playback function), and the like. In addition, the memory 409 may include a volatile memory or a non-volatile memory, or the memory 409 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synch link dynamic random access memory (SLDRAM), or a direct rambus random access memory (DRRAM). The memory 409 in this embodiment of this application includes, but is not limited to, these memories and a memory of any other suitable type.

The processor 410 may include one or more processing units. Optionally, the processor 410 integrates an application processor and a modem processor. The application processor mainly processes and involves in operations of the operating system, a user interface, an application program, and the like. The modem processor, for example, a baseband processor, mainly processes a wireless communication signal. It may be understood that the modem processor may alternatively not be integrated into the processor 410.

An embodiment of this application further provides a readable storage medium. The readable storage medium stores a program or instructions. When the program or the instructions are executed by a processor, processes of the embodiment of the method for sending video data are implemented, and same technical effects can be achieved. To avoid repetition, details are not described herein again.

The processor is the processor in the electronic device described in the foregoing embodiment. The readable storage medium includes a computer-readable storage medium, such as a computer read-only memory ROM, a random access memory RAM, a magnetic disk, or an optical disc.

An embodiment of this application further provides a chip. The chip includes a processor and a communication interface. The communication interface is coupled to the processor, and the processor is configured to run a program or instructions, to implement processes of the embodiment of the method for sending video data, and same technical effects can be achieved. To avoid repetition, details are not described herein again.

It should be understood that the chip mentioned in this embodiment of this application may also be referred to as a system-level chip, a system chip, a chip system, a system-on-chip, or the like.

An embodiment of this application provides a computer program product. The program product is stored in a storage medium. The program product is executed by at least one processor to implement processes of the embodiment of the method for sending video data, and same technical effects can be achieved. To avoid repetition, details are not described herein again.

It needs to be noted that, in this specification, terms "include", "comprise", or any other variant thereof are intended to cover non-exclusive inclusion, so that a process, method, product, or apparatus that includes a series of elements includes not only the elements, but also another element not expressly listed, or an element inherent to such a process, method, product, or apparatus. An element defined by a statement "includes a . . . " does not exclude, without more limitations, existence of another same element in a process, method, product, or apparatus that includes the element. In addition, it should be noted that the scopes of the method and apparatus in the implementations of this application are not limited to performing the functions in the order shown or discussed, and the functions may alternatively be performed in a substantially simultaneous manner or in a reverse order according to the functions involved. For example, the methods described may be performed in an order different from the order described, and various steps may further be added, omitted, or combined. In addition, features described with reference to some examples may be combined in another example.

According to the foregoing descriptions of the implementations, a person skilled in the art may clearly understand that the methods in the embodiments may be implemented by using software plus a necessary universal hardware platform, and certainly may alternatively be implemented by hardware. However, in many cases, the former is a better implementation. Based on this understanding, the technical solutions of this application essentially or a part contributing to the prior art may be implemented in a form of a computer software product. The computer software product is stored in a storage medium (such as a ROM/RAM, a magnetic disk, or an optical disc), and includes several instructions to enable a terminal (which may be a mobile phone, a computer, a server, a network device, or the like) to perform the methods in the embodiments of this application.

The foregoing describes the embodiments of this application with reference to the accompanying drawings. However, this application is not limited to the foregoing specific implementations. The foregoing specific implementations are merely examples, but are not limitative. Inspired by this application, a person of ordinary skill in the art may further make modifications without departing from the purposes of this application and the protection scope of the claims, and all the modifications shall fall within the protection of this application.

The invention claimed is:

1. A method for sending video data, wherein the method comprises:

encoding a video stream by using a first encoder in a server, to generate first encoded data, and sending the first encoded data to at least one first user equipment;

in a case that the server receives a first video display request corresponding to the first encoded data and sent by a second user equipment, encoding the video stream by using a second encoder, to generate second encoded data, and sending the second encoded data to the second user equipment; and in a case that the first encoded data satisfies a preset condition, sending the first encoded data to the second user equipment, continuing to send the first encoded data to the at least one first user equipment, and stopping sending the second encoded data to the second user equipment;

wherein the encoding the video stream by using a second encoder, to generate second encoded data comprises:

generating the second encoded data that comprises second I-frame data and that is of preset duration; and the method further comprises:

caching the second encoded data of the preset duration; and in a case that the server receives a second video display request corresponding to the first encoded data and sent by a third user equipment, if duration between a time point at which the second video display request is received and a time point at which the second I-frame data is generated is shorter than the preset duration, sending the cached second encoded data to the third user equipment;

wherein after the sending the cached second encoded data to the third user equipment, the method further comprises:

in a case that duration after the second I-frame data is generated satisfies the preset duration, generating I-frame data next to the second I-frame data by using the second encoder; and in a case that the I-frame data next to the second I-frame data is generated, sending the second encoded data to the third user equipment, and stopping sending the cached second encoded data to the third user equipment.

2. The method according to claim 1, wherein the encoding a video stream by using a first encoder in a server, to generate first encoded data comprises:

encoding the video stream by using the first encoder in the server, to generate first I-frame data and a plurality of pieces of P-frame data corresponding to the first I-frame data, wherein the first encoder is configured to generate I-frame data based on the video stream at preset time intervals; and the in a case that the first encoded data satisfies a preset condition, sending the first encoded data to the second user equipment comprises:

in a case that I-frame data next to the first I-frame data is generated by using the first encoder, sending the first encoded data to the second user equipment, wherein a time point at which the first video display request is received is between a time point at which the first I-frame data is generated and a time point at which the I-frame data next to the first I-frame data is generated.

3. The method according to claim 1, wherein after the caching the second encoded data of the preset duration, the method further comprises: in a case that I-frame data next to the second I-frame data is generated by using the second encoder, replacing the cached second encoded data based on the I-frame data next to the second I-frame data.

4. The method according to claim 1, wherein the in a case that the first encoded data satisfies a preset condition, sending the first encoded data to the second user equipment, continuing to send the first encoded data to the at least one first user equipment, and stopping sending the second encoded data to the second user equipment comprises:

in the case that the I-frame data next to the first I-frame data is generated by using the first encoder, sending the first encoded data to the second user equipment and the third user equipment, continuing to send the first encoded data to the at least one first user equipment, and stopping sending the second encoded data to the third user equipment and the second user equipment, wherein both the time point at which the first video display request is received and the time point at which the second video display request is received are between the time point at which the first I-frame data is generated and the time point at which the I-frame data next to the first I-frame data is generated.

5. A chip, wherein the chip comprises a processor and a communication interface, the communication interface is coupled to the processor, and the processor is configured to run a program or instructions, to implement steps of the method for sending video data according to claim 1.

6. A computer program, wherein the computer program is stored in a non-transitory storage medium, and the computer program is executed by at least one processor, to implement steps of the method for sending video data according to claim 1.

7. An electronic device, comprising a processor and a memory, wherein the memory stores a program or instructions executable on the processor, wherein the program or instructions, when executed by the processor, cause the electronic device to perform:

encoding a video stream by using a first encoder in a server, to generate first encoded data, and sending the first encoded data to at least one first user equipment;

in a case that the server receives a first video display request corresponding to the first encoded data and sent by a second user equipment, encoding the video stream by using a second encoder, to generate second encoded data, and sending the second encoded data to the second user equipment; and in a case that the first encoded data satisfies a preset condition, sending the first encoded data to the second user equipment, continuing to send the first encoded data to the at least one first user equipment, and stopping sending the second encoded data to the second user equipment;

wherein when encoding the video stream by using a second encoder, to generate second encoded data, the program or instructions, when executed by the processor, cause the electronic device to perform:

generating the second encoded data that comprises second I-frame data and that is of preset duration; and the program or instructions, when executed by the processor, cause the electronic device to further perform:

caching the second encoded data of the preset duration; and in a case that the server receives a second video display request corresponding to the first encoded data and sent by a third user equipment, if duration between a time point at which the second video display request is received and a time point at which the second I-frame data is generated is shorter than the preset duration, sending the cached second encoded data to the third user equipment;

wherein after sending the cached second encoded data to the third user equipment, the program or instructions, when executed by the processor, cause the electronic device to further perform:

in a case that duration after the second I-frame data is generated satisfies the preset duration, generating I-frame data next to the second I-frame data by using the second encoder; and in a case that the I-frame data next to the second I-frame data is generated, sending the second encoded data to the third user equipment, and stopping sending the cached second encoded data to the third user equipment.

8. The electronic device according to claim 7, wherein when encoding a video stream by using a first encoder in a server, to generate first encoded data, the program or instructions, when executed by the processor, cause the electronic device to perform:

encoding the video stream by using the first encoder in the server, to generate first I-frame data and a plurality of pieces of P-frame data corresponding to the first I-frame data, wherein the first encoder is configured to generate I-frame data based on the video stream at preset time intervals; and when in a case that the first encoded data satisfies a preset condition, sending the first encoded data to the second user equipment, the program or instructions, when executed by the processor, cause the electronic device to perform:

in a case that I-frame data next to the first I-frame data is generated by using the first encoder, sending the first encoded data to the second user equipment, wherein a time point at which the first video display request is received is between a time point at which the first I-frame data is generated and a time point at which the I-frame data next to the first I-frame data is generated.

9. The electronic device according to claim 7, wherein after caching the second encoded data of the preset duration, the program or instructions, when executed by the processor, cause the electronic device to further perform:

in a case that I-frame data next to the second I-frame data is generated by using the second encoder, replacing the cached second encoded data based on the I-frame data next to the second I-frame data.

10. The electronic device according to claim 7, wherein when in a case that the first encoded data satisfies a preset condition, sending the first encoded data to the second user equipment, continuing to send the first encoded data to the at least one first user equipment, and stopping sending the second encoded data to the second user equipment, the program or instructions, when executed by the processor, cause the electronic device to perform:

in the case that the I-frame data next to the first I-frame data is generated by using the first encoder, sending the first encoded data to the second user equipment and the third user equipment, continuing to send the first encoded data to the at least one first user equipment, and stopping sending the second encoded data to the third user equipment and the second user equipment, wherein both the time point at which the first video display request is received and the time point at which the second video display request is received are between the time point at which the first I-frame data is generated and the time point at which the I-frame data next to the first I-frame data is generated.

11. A non-transitory readable storage medium, wherein the readable storage medium stores a program or instructions, wherein the program or instructions, when executed by a processor, cause the processor to perform:

encoding a video stream by using a first encoder in a server, to generate first encoded data, and sending the first encoded data to at least one first user equipment;

in a case that the server receives a first video display request corresponding to the first encoded data and sent by a second user equipment, encoding the video stream by using a second encoder, to generate second encoded data, and sending the second encoded data to the second user equipment; and in a case that the first encoded data satisfies a preset condition, sending the first encoded data to the second user equipment, continuing to send the first encoded data to the at least one first user equipment, and stopping sending the second encoded data to the second user equipment;

wherein when encoding the video stream by using a second encoder, to generate second encoded data, the program or instructions, when executed by the processor, cause the processor to perform:

generating the second encoded data that comprises second I-frame data and that is of preset duration; and the program or instructions, when executed by the processor, cause the processor to further perform:

caching the second encoded data of the preset duration; and in a case that the server receives a second video display request corresponding to the first encoded data and sent by a third user equipment, if duration between a time point at which the second video display request is received and a time point at which the second I-frame data is generated is shorter than the preset duration, sending the cached second encoded data to the third user equipment;

wherein after sending the cached second encoded data to the third user equipment, the program or instructions, when executed by the processor, cause the processor to further perform:

in a case that duration after the second I-frame data is generated satisfies the preset duration, generating I-frame data next to the second I-frame data by using the second encoder; and in a case that the I-frame data next to the second I-frame data is generated, sending the second encoded data to the third user equipment, and stopping sending the cached second encoded data to the third user equipment.

12. The non-transitory readable storage medium according to claim 11, wherein when encoding a video stream by using a first encoder in a server, to generate first encoded data, the program or instructions, when executed by the processor, cause the processor to perform:

encoding the video stream by using the first encoder in the server, to generate first I-frame data and a plurality of pieces of P-frame data corresponding to the first I-frame data, wherein the first encoder is configured to generate I-frame data based on the video stream at preset time intervals; and when in a case that the first encoded data satisfies a preset condition, sending the first encoded data to the second user equipment, the program or instructions, when executed by the processor, cause the electronic device to perform:

in a case that I-frame data next to the first I-frame data is generated by using the first encoder, sending the first encoded data to the second user equipment, wherein a time point at which the first video display request is received is between a time point at which the first I-frame data is generated and a time point at which the I-frame data next to the first I-frame data is generated.

13. The non-transitory readable storage medium according to claim 11, wherein after caching the second encoded data of the preset duration, the program or instructions, when executed by the processor, cause the processor to further perform:

in a case that I-frame data next to the second I-frame data is generated by using the second encoder, replacing the cached second encoded data based on the I-frame data next to the second I-frame data.

14. The non-transitory readable storage medium according to claim 11, wherein when in a case that the first encoded data satisfies a preset condition, sending the first encoded data to the second user equipment, continuing to send the first encoded data to the at least one first user equipment, and stopping sending the second encoded data to the second user equipment, the program or instructions, when executed by the processor, cause the processor to perform:

in the case that the I-frame data next to the first I-frame data is generated by using the first encoder, sending the first encoded data to the second user equipment and the third user equipment, continuing to send the first encoded data to the at least one first user equipment, and stopping sending the second encoded data to the third user equipment and the second user equipment, wherein both the time point at which the first video display request is received and the time point at which the second video display request is received are between the time point at which the first I-frame data is generated and the time point at which the I-frame data next to the first I-frame data is generated.

* * * * *